United States Patent

[11] 3,550,507

| [72] | Inventor | Robert E. Schott<br>New Berlin, Wis. |
|---|---|---|
| [21] | Appl. No. | 753,103 |
| [22] | Filed | Aug. 16, 1968 |
| [45] | Patented | Dec. 29, 1970 |
| [73] | Assignee | Allis-Chalmers Manufacturing Company<br>Milwaukee, Wis. |

[54] HYDRAULIC VALVE
9 Claims, 6 Drawing Figs.

[52] U.S. Cl. .................................................. 91/446,
60/51, 192/87.13, 192/52
[51] Int. Cl. .......................................................F15b 11/08,
F16d 21/00
[50] Field of Search ...................................... 60/(Inquired);
192/(Inquired), 52, 87.13; 91/446,
468, 444; 137/(Inquired)492, 492.5, 505.14,
505.15

[56] References Cited
UNITED STATES PATENTS

| 2,505,450 | 4/1950 | Wemp .......................... | 192/87.13X |
| 2,933,172 | 4/1960 | Fisher et al. .................. | 192/87.13 |
| 2,971,536 | 2/1961 | Junck et al. .................... | 91/446X |
| 3,060,896 | 10/1962 | McIntyre ....................... | 91/446X |
| 3,064,779 | 11/1962 | Christenson .................. | 192/52X |
| 3,182,775 | 5/1965 | Schall ............................ | 192/87.13X |
| 3,223,000 | 12/1965 | Payne et al. .................. | 91/446X |
| 3,389,770 | 6/1968 | Golan et al. .................. | 192/87.13 |
| 3,455,210 | 7/1969 | Allen ............................. | 91/446 |

*Primary Examiner*—Martin P. Schwadron
*Assistant Examiner*—Irwin C. Cohen
*Attorneys*—Arthur L. Nelson, Kenneth C. McKivett and Robert B. Benson

ABSTRACT: A hydraulic system including a control valve and a pressure-reducing valve in the fluid inlet passage engaged by a spring-biased accumulator to provide a minimum actuating pressure and a controlled pressure increase to a hydraulic fluid actuator.

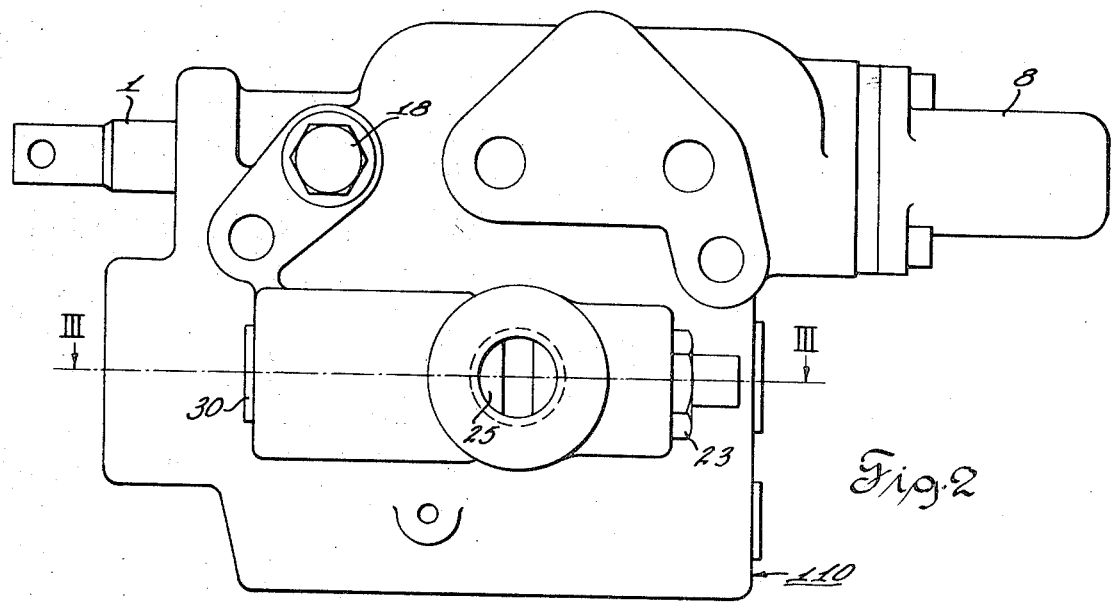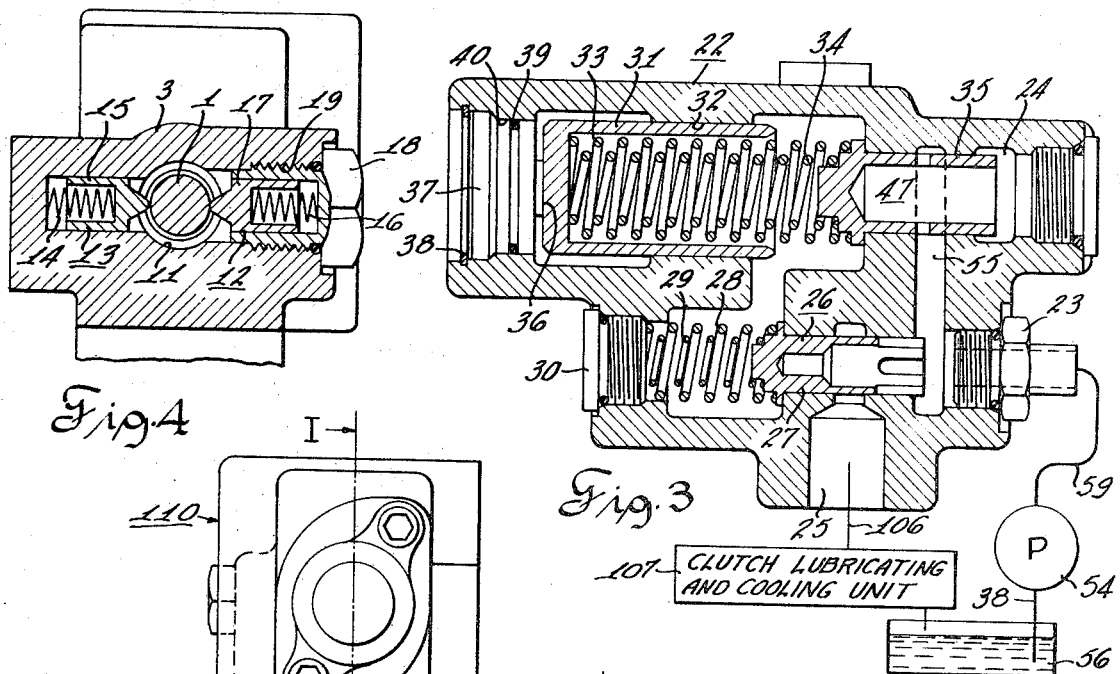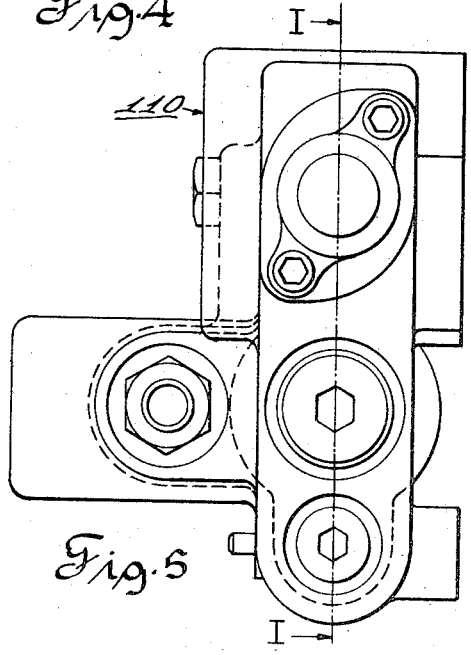

HYDRAULIC VALVE

This invention relates to a hydraulic system and more particularly to a hydraulic control valve having automatic pressure modulating means to supply a limited initial actuating pressure and a modulated pressure increase to a fluid actuator.

Hydraulic systems are used to perform work in various manners. A hydraulic ram is used to lift or to permit lowering of an implement in response to admission or discharge of fluid into a hydraulic ram. Hydraulic systems are further used to operate a clutch or brake. A source of pressurized fluid supplies the energy to operate a hydraulic actuator.

The fluid actuator used to engage or disengage the clutch must be pressurized gradually to synchronize rotating speeds for reducing shock. If the vehicle engine is slowed down before the load is applied through a clutch, the shock is reduced substantially because the vehicle is not accelerated as greatly. It is quire apparent, however, that this is impractical and the amount of work accomplished by the operator driving a vehicle with this type of slowdown operation for shifting gears and applying clutches would be substantially reduced. Accordingly, a shuttle clutch is used to overcome this problem.

For the purpose of illustration, a hydraulic valve controlling a shuttle clutch will be described in this application. A shuttle clutch is usually positioned between the engine and the transmission or torque converter and transmission. The shuttle clutch will usually provide a greater speed range for a standard transmission or a torque converter and a quick shift from forward to reverse when used in the drive system of such a vehicle. The shuttle clutch as conventionally known is usually shifted while the vehicle is in operation and the shifting is done quickly. Accordingly, there are inertia problems because of the kinetic energy stored in the elements rotating at different speeds which are being coupled. The roughness and shock will be reduced substantially if the pressure of the fluid actuator engaging the clutch is modulated during engagement. In other words, the hydraulic actuator engaging the shuttle clutch will initially engage at a reduced pressure permitting a degree of slippage between the clutch plates and upon engagement of the clutch, the pressure in the hydraulic actuator will be gradually increased. In this manner, the magnitude of power transmission with the use of a shuttle clutch can be substantially greater with less strain than with a conventional valve and shuttle clutch.

It is an object of this invention to provide a hydraulic valve with modulating means controlling the pressure of the fluid supplied to a hydraulic fluid actuator.

It is another object of this invention to provide a control valve with pressure-modulating means to provide a limited pressure for initial operation of the hydraulic actuator and gradual increasing pressure supplied to the actuator for smooth operation of a device operated by the hydraulic actuator.

It is a further object of this invention to provide a control valve having a constant pressure source of pressurized fluid and an accumulator controlling the initial actuating pressure and the gradual increase in pressure supplied to a hydraulic actuator as accumulator pressure builds up.

It is a further object of this invention to provide a control valve having an accumulator operated minimum pressure valve and a pressure buildup responsive to a rate of pressure increase in the accumulator subsequent to discharge of the accumulator to sump upon initial actuation of the control valve.

The objects of this invention are accomplished by providing a control valve including a manually operated spool having two actuating positions with pressure-modulating means to supply pressurized fluid to fluid actuators. The pressurized fluid is supplied to the control valve and the pressure of the fluid is regulated in the valve. The control valve modulator includes an accumulator and a reducing valve which are interrelated in such a manner that the pressure of fluid supplied to the spool valve chamber is responsive to the condition of discharge of the accumulator. The accumulator discharges into a reservoir upon initial actuation of the control valve which in turn reduces the admission pressure of the fluid through reducing valve. The pressure supplied to a fluid actuator is gradually increased in response to the increase in pressure in the accumulator. The control valve has provisions for supplying pressurized fluid for additional hydraulic functions such as torque converters, etc.

The preferred embodiments of this invention will be subsequently described and illustrated as follows:

FIG. 2 illustrates a side view of the control valve;

FIG. 3 illustrates a cross section view taken on line III-III of FIG. 2;

FIG. 4 is a cross section view taken on line IV-IV of FIG. 1;

FIG. 5 is an end view of the control valve; and

FIG. 6 is a graph illustrating the pressure as it is modulated in the actuating chamber of the control valve when the manually operated spool is actuated suddenly.

Figure 1:
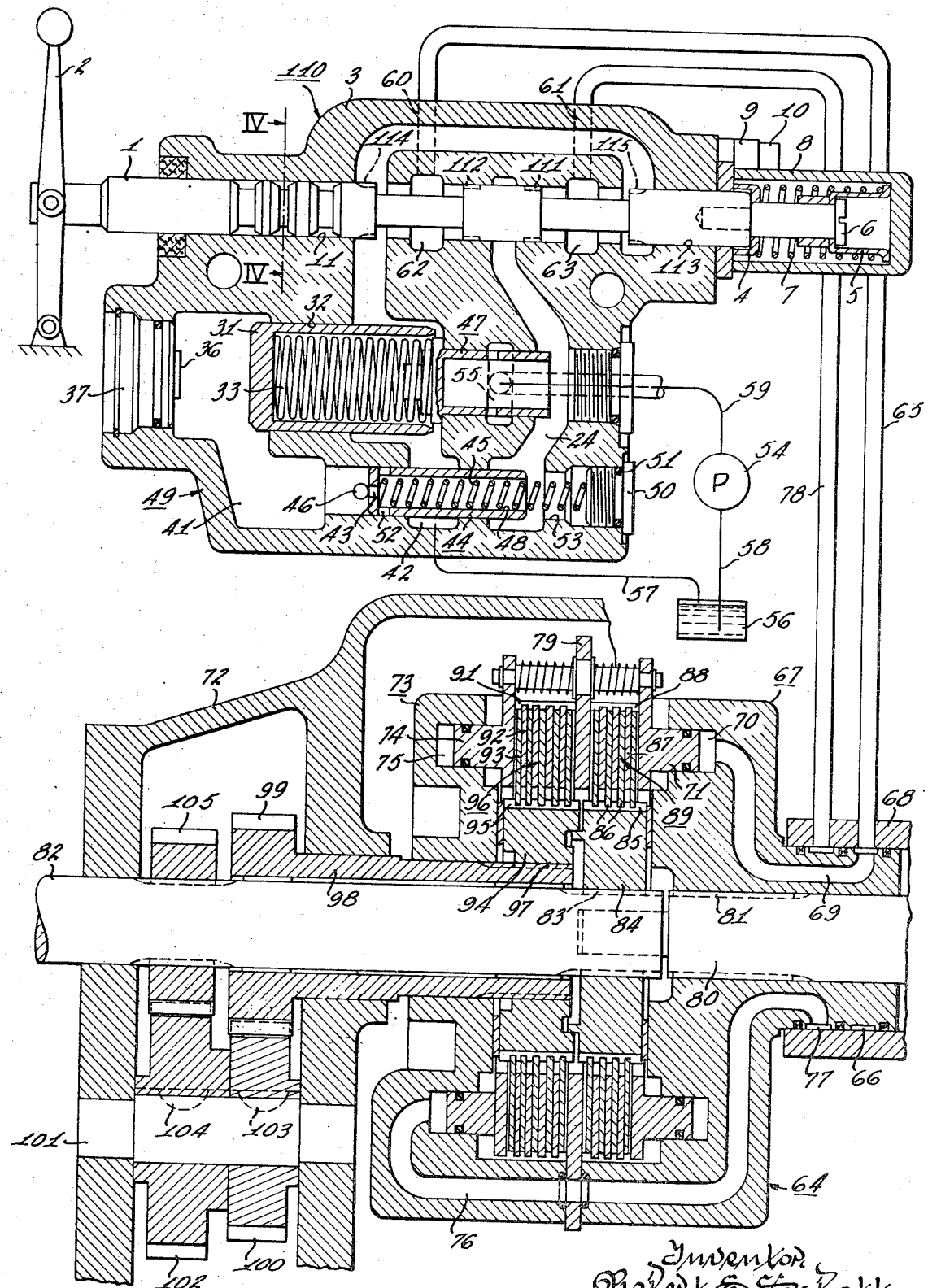
FIG. 1 illustrates a cross section view of the control valve and a shuttle clutch.

Referring to the drawings, the control valve includes a pressure regulator valve which maintains a constant supply of oil pressure to the modulator. The oil passing through the pressure control valve is available for other functions in the circuit as well.

A modulator is incorporated into the system to provide rapid clutch filling and a time controlled pressure rise in the clutches. The modulator includes a pressure-reducing valve receiving fluid from the pressure control valve and an accumulator having an accumulator piston, an accumulator discharge valve with an orifice interrelated to provide the modulating function. The pressure reducing valve has a minimum setting of, for example, 40 p.s.i. when the accumulator is exhausted, and a maximum setting, for example, of 250 p.s.i. when the accumulator is filled. The accumulator is filled by oil flowing through the orifice in the accumulator discharge valve plunger. Oil flowing into the accumulator will force the accumulator piston to compress the springs between it and the pressure-reducing valve plunger. The compression of these springs will increase the pressure setting of the pressure-reducing valve according to the flowing pressure time equation:

$$\frac{dp}{dt} = \frac{KC_1}{A_1 A_2} \left(1 - \frac{A_1}{A_2}\right)^{1/2} p^{1/2}$$

In the preceding equation P is the pressure in the core area; t is the time and $A_1$ is the cross-sectional area of the pressure-reducing valve plunger, $A_2$ is cross-sectional area of the accumulator piston, and K and C are spring and orifice constants, respectively.

When the close center manually operated spool valve is shifted and oil is allowed to flow into the clutches, there will be a rapid drop of pressure in the modulator. This will cause the accumulator discharge valve plunger to overcome its spring and move to seal off the accumulator area from the source of pressurized fluid. Movement of this plunger also allows the oil in the accumulator to be discharged directly to the sump. After the accumulator is discharged, the accumulator discharge valve spring will return the plunger to its original position, thereby opening the accumulator area to the oil pressure source. Then as the oil pressure rises to the accumulator, the oil pressure rise in the clutches will be governed by the pressure time relationship described in the equation above.

The spool valve which is manually operated may be gradually shifted from one position to the other to provide forward, neutral or reverse clutch position. If the spool is gradually shifted, the small machine-throttling grooves on the spool will provide gradual actuation of the actuator. The accumulator discharges and refills when the spool valve is suddenly shifted from one position to another for forward or reverse engagement of the shuttle clutch.

Referring to FIG. 1, the spool 1 is operated by a lever 2 to reciprocally move within the housing 3. The spool 1 is connected to a cup 4 and a spring retainer 5 by means of the screws 6. The spring 7 is compressed between the cup 4 and retainer 5 and maintains the neutral position of the spool within the housing 3. The cap 8 has the radial flange 9 for fastening by the bolt 10 to the housing 3.

Referring to FIG. 4 the spool 1 is slidably mounted within the central opening 11 and engages the detents 12, 13. The detent 13 includes the spring 14 within the element 15, and the detent 12 includes a similar spring 16 within the element 17 which is retained within the housing by means of the nut 18 threadably engaging the threaded opening 19 in the housing 3.

FIG. 3 shows a source of pressurized fluid 20 connected by conduit means 21 to the control valve 22. The conduit 21 is fastened by a fitting 23 to the housing to supply pressurized fluid to the inlet chamber 55. Pressurized fluid in passage 25 is available to other fluid actuators including torque converters in the system. The passage 25 is shown connected to a clutch cooling and lubricating unit. The pressure regulator valve 26 regulates the pressure of fluid supplied to the shuttle clutch through the chamber 55. The regulator valve 26 includes a plunger 27 biased by the springs 28, 29 in the right-hand direction which are compressed between the plunger 27 and the end plug 30.

FIGS. 1 and 3 illustrate the accumulator in the control valve. The accumulator includes a piston 31 slidably mounted within the opening 32 and spring biased in the left-hand direction by springs 33, 34. The springs 33, 34 mount on the end of reducing valve plunger 35 and are received within the piston 31. The springs 33 and 34 bias the pressure-reducing valve plunger 35 in the right-hand direction with a varying force in response to the position of the accumulator piston 31. The force on the pressure-reducing valve plunger 35 controls the pressure required to operate the plunger 35 on the opposite side of the plunger in chamber 24. The accumulator plunger 31 moves to an extreme left-hand position where it engages a seat 36 on the end plug 37 which is fastened in the housing 3 by a suitable means such as a snap ring 38. The end plug 37 is embraced by a seal 39 received within the opening 40.

The pressure in chamber 41 builds up to a pressure equal to the pressure in chamber 24 when the accumulator is fully charged. The pressurized fluid in chamber 41 is discharged into the sump chamber 42 when the accumulator discharges. The accumulator is charged through an orifice 43 in the end of the accumulator discharge plunger 44. A plunger spring 45 biases the discharge plunger 44 in a left-hand direction to a position seating on the cross pin 46 held in the housing 3. Pressurized fluid entering through the reducing valve 47 flows into chamber 24 from passage 55. Fluid from chamber 24 flows through opening 48 in the discharge plunger 44 and through the orifice 43 into chamber 41 of the accumulator. The pressure rise in chambers 24 and 41 is controlled by the rate of flow into the accumulator and when the accumulator 49 is completely filled the pressurized fluid in the chambers 24 and 41 are equal.

The spring 45 which is seated within the plunger 44 and the plug 50 which threadably engages an opening in the end of the housing 3. Suitable seal 51 is provided in an annual recess of the plug 50 to seal the plug 50 with the housing 3.

The discharge plunger 44 is also provided with a plurality of openings 52 which extend radially in the end of the plunger which permit discharge of fluid within the opening 48 as the right-hand end of the plunger is received within the opening 53 when the accumulator 49 is discharged.

The hydraulic control valve 110 is connected to the pump 54 through the inlet port 55. The pump 54 receives fluid from the sump 56. An outlet port is also in communication with the chamber 42 through conduit 57 which returns low pressure fluid to the sump 56. The conduits 58, 59 are connected to the low side and the high side of the pump 54, respectively.

The control valve also defines two fluid actuator ports 60, 61 which are connected to chambers 62 and 63, respectively. The chambers 62, 63 are selectively and alternatively connected to chamber 24 in response to movement of the spool 1. For the purpose of illustration, the control valve is connected to a shuttle clutch 64 by means of conduits 65, 78. The conduit 65 is in communication with an annular recess 66 formed in a cylinder 67. A sleeve 68 embraces the small diameter portion of the cylinder 67 in which is also formed the passage 69 which leads to the chamber 70 defined by the cylinder 67 and the piston 71. The cylinder 67 is enclosed by the casing 72 which also encircles a second cylinder 73. The cylinder 73 together with the piston 74 define a pressurized fluid chamber 75 which is in communication with a passage 76. The passage 76 is connected to annular recess 77 formed in the cylinder 67 and connnected to the conduit 78. The passage 76 passes through the pressure plate 79 which is provided with suitable sealing means to permit the flow of pressurized fluid from the right-hand to left-hand direction to the pressurized fluid chamber in the cylinder 73.

The drive shaft 80 is rotatably mounted in the right-hand end of the casing 72, and is received within and splined to the cylinder by the spline 81 to rotate with the cylinder. The driven shaft 82 is rotatably supported in the casing 72 and is splined by the spline 83 to the collar 84. The collar 84 has external splines 85 which are received within the plurality of discs 86. The clutch discs 87 are similarly received within the spline 88 in the cylinder 67. When the piston 71 is actuated, the disc stack 89 is compressed and power is transmitted from the drive shaft 80 to the collar 84 to the cylinder 67.

Similarly, power can be transmitted through the connection between the cylinders 73 and 67 through spline 91 which receives the clutch discs 92 which frictionally engage the clutch discs 93. The clutch discs 93 encircle the collar 94 which defines a spline 95 which is received within the internal periphery of the discs 93. When the piston 74 compresses the disc stack 96 against the pressure plate 79, the power is transmitted from the collar 94 and the spline 97 on the sleeve 98. The sleeve 98 is formed integral with the gear 99 which is driven by a gear 100 on the countershaft 101. The countershaft 101 also carries a gear 102. The gears 100 and 102 are fastened to the countershaft by suitable keys 103 and 104, respectively. The countershaft 101 carrying the gears 100 and 102, is driven by the driven gear 105 on shaft 82 which provides reverse rotation of shaft 82 when the power is driven through the countershaft 101.

Accordingly, FIG. 1 illustrates the shuttle clutch which is operated by the control valve. The control valve is in a hydraulic system which will also provide pressurized fluid for other fluid functions. The other fluid functions may include a torque converter, a power takeoff valve, or clutch lubricating and cooling system. For the purpose of illustration, the conduit 106 is connected to a clutch lubricating and cooling unit 107 which in turn returns the hydraulic fluid to the sump 56.

FIG. 6 illustrates graphically the pressure rise with response to time as the control valve is actuated. The control valve carries a pressure of approximately 250 p.s.i. when under normal operation. This pressure is present in the chamber 24 until the spool 1 is suddenly moved in either of the two directions at which time the pressure drops below 40 p.s.i., at which time the accumulator discharges. The discharge of the accumulator then permits a buildup of pressure as shown from below 40 p.s.i. in the chamber 24. The pressure buildup again reaches 250 p.s.i. as shown. The controlling of the pressure allows a degree of clutch slippage which is controlled to prevent shock in the actuation of the clutch. As the pressure is built up the power is transmitted through the clutch with a controlled amount of slippage to provide smooth operation.

Referring to the drawings, the operation of the device will be described in the following paragraph.

The manual control lever 2 is connected to the spool 1 which is reciprocated within the housing 3 of the control valve 110. If the spool 1 is moved slowly, grooves 111 or 112, depending on which direction the spool is moved, will slowly permit the flow of pressurized fluid from the chamber 24 to the chamber 62 or 63, while grooves 114 and 115 are closed.

For the purpose of illustration, consider the spool 1 moving in a righthand direction, then the pressurized fluid in chamber 24 will pass through the plurality of grooves 112 into the central opening 113 receiving the spool 1. The throttling and restricted flow through the grooves 112 and 114 will permit a gradual buildup of pressure in the conduit 65 which in turn is in communication with the chamber 70 in the cylinder 67. As the pressure increases the disc stack 89 is compressed and power is transmitted from the shaft 80 through the cylinder 67, the disc stack which in turn drives the driven shaft 82.

The shuttle clutch is usually actuated while a vehicle is in motion and therefore is usually actuated quite rapidly. Accordingly, when the manual lever 2 is thrown rearwardly the surge of pressurized fluid from the chamber 24 rushes into the chamber 62, through the conduit 65 to the pressurizing chamber 70 to actuate the clutch. The fluid displaced from the chamber 24 will decrease the pressure in the chamber 24, however, the pressure will decrease to approximately 40 p.s.i. This pressure is obtained by the design of the passage, valves and so on in the circuitry to assure immediate response of the clutch when the valve is actuated.

The decrease in pressure in chamber 24 causes the discharge plunger 44 to move in a right-hand direction and the end of the plunger 44 is received in the opening 53 maintaining the pressure of approximately 40 p.s.i. in the chamber 24. The plunger 44 moves in the right-hand direction permitting the flow of pressurized fluid from chamber 41 to the chamber 42 as the accumulator is discharged. Any fluid within the central opening 48 of the plunger 44 is discharged through the radial openings 52 into the chamber 42, which in turn is in communication with the sump through the conduit 57. The discharge of pressurized fluid from the accumulator is quite rapid, and the piston 31 is biased to the left-hand direction by the springs 33 and 34 reducing the force on the reducing valve 47.

The spring force on the valve element 47 is reduced as the piston 31 moves in the left-hand direction. Although the pressure in chamber 24 is drastically reduced when the accumulator 49 discharges into the sump, the pressure will again buildup substantially as indicated on the graphical illustration of FIG. 6. Pressurized fluid flowing into sump 56 will reduce the pressure in chamber 41 to approximately 20 p.s.i. at which time the discharge plunger 44 will begin to move in a left-hand direction and again provide communication between the chambers 24 and 41 through the opening 48 into discharge plunger 44. The pressure in chamber 24, although initially decreased to approximately 40 p.s.i., begins to buildup because the volume displacement required to actuate the clutch has engaged the disc stack and relatively small amount of fluid is displaced once the clutch is engaged. The pressurized fluid then flows through the central opening 48 in the discharge plunger 44 through the orifice 43 and into the chamber 41. The pressure continues to buildup until the accumulator piston 31 returns to a position as indicated in FIG. 3. In this position the plunger has biased the springs 33 and 34 in a compressive position at which the pressure of the fluid in chamber 24 is approximately 250 p.s.i.. The pressure is controlled by the pressure reducing valve 47 in response to the compression springs 33 and 34 which in turn are responsive to the pressure in the chamber 41 of the accumulator. Accordingly, the fluid in chamber 41 is not discharged into the clutch-actuating circuit but is discharged directly into sump. The pressure in chamber 24 builds up in response to the rate of charge of the accumulator which in turn is dependent on the area of pressure-reducing valve plunger, the area of the accumulator piston, as well as the spring and orifices constant. It can be seen that the rate of increase and the pressure in the accumulator can be controlled according to design to provide the proper clutching and declutching to eliminate shock during the transition from no load to full load of the shuttle clutch. The accumulator 49 is triggered in response to the pressure in the chamber 24, and the discharge of the accumulator will be complete. The discharge of the accumulator is triggered when a certain pressure drop is encountered in the chamber 24 which is then in communication with the actuator. The accumulator will then charge and it is the charging of the accumulator that controls the pressure which is supplied to the fluid actuator such as the shuttle clutch.

The cycle is initiated by the manual operation of the spool 1 to provide a rapid decrease in pressure in the chamber 24. Without the accumulator circuit the sudden surge of pressurized fluid to the shuttle clutch and its subsequent rapid buildup would produce roughness and shock in the power transmission. Pressure reducing valve 47 will close off at a low pressure to prevent the rapid pressure buildup and maintain the low application pressure permitting a degree of slippage in the clutch which would provide smooth transmission to synchronize rotation of the two rotating masses of the driving and driven elements.

I claim:

1. In a hydraulic system a control valve having pressure-modulating means comprising, housing means defining an inlet passage adapted for connection to a source of pressurized fluid, an exhaust passage adapted for connection to sump, at least one actuator passage adapted for connection to a fluid actuator, a control valve element mounted in said housing for movement to selectively and alternatively connect said inlet passage to said actuator passage, an accumulator defining a variable volume and pressure chamber and including a spring biasing said accumulator to a minimum volume position, a pressure-reducing valve in said inlet passage having a valve element engaging said accumulator spring for controlling the flow of pressurized fluid in said inlet passage in response to accumulator pressure, an accumulator control means connected between said inlet passage, said exhaust passage and said accumulator for selectively connecting said accumulator with said inlet passage, and said exhaust passage, orifice means in said accumulator control means, said accumulator control means selectively preventing said accumulator from communicating through said orifice means with said inlet passage and subsequently discharging said accumulator into said exhaust passage in response to reducing the pressure in said inlet passage when said valve element is operated, said orifice means in said accumulator control means transmitting pressurized fluid from said inlet passage to said accumulator to thereby control the inlet passage pressure for supplying pressurized fluid to said actuator passage in response to the pressure of said accumulator.

2. In a hydraulic system a control valve having pressure-modulating means comprising, a housing means defining an inlet passage adapted for connection to a source of pressurized fluid, an exhaust passage adapted for connection to sump, at least one actuator passage adapted for connection to a fluid actuator, an accumulator for receiving pressurized fluid defining a variable volumed pressure chamber and including a spring biasing said accumulator to a minimum volume position, an accumulator control means connected between said inlet passage, said exhaust passage, and said accumulator, an accumulator operated pressure-reducing valve in said inlet passage engaging said accumulator spring and operating in response to the pressure of pressurized fluid in said accumulator, a control valve element mounted for movement in said housing means to selectively and alternatively connect said inlet passage to said actuator passage, orifice means in said accumulator control means connecting said accumulator to said inlet passage, said accumulator control means sequentially disconnecting said accumulator from said inlet passage and connecting said accumulator to said exhaust passage in response to fluid displacement and a pressure change in said inlet passage, said orifice means in said accumulator control means connecting said accumulator to said inlet passage to build up pressure in said accumulator to control the rate of pressure rise in said actuator passage to provide modulated pressure from said control valve.

3. In a hydraulic system a control valve having pressure-modulating means as set forth in claim 1 wherein said control valve includes in said inlet passage upstream from said pressure-reducing valve a regulating valve to regulate pressure of the pressurized fluid received from a source of pressurized fluid.

4. In a hydraulic system a control valve having pressure-modulating means as set forth in claim 2 wherein said pressure-reducing valve includes a plunger and said accumulator includes a piston, said accumulator spring engaging said plunger and piston controlling the operating pressure of said reducing valve in response to the pressure in said accumulator to thereby control the initial actuating pressure in said actuator passage and controlling the rate of pressure increase in said actuator passage for controlling the actuator.

5. In a hydraulic system a control valve having pressure-modulating means set forth in claim 2 wherein said accumulator control means includes a plunger having a predetermined area subject to the accumulator pressure.

6. In a hydraulic system a control valve having pressure-modulating means as set forth in claim 1 wherein said at least one actuator passage comprises two separate and distinct passages adapted for operating two separate actuators and means moving said control valve element in either of two directions to thereby provide selective and alternative communication between the first and the second of said actuator passages and said inlet passage.

7. In a hydraulic system a control valve having pressure-modulating means as set forth in claim 6 wherein said actuator passages include shuttle clutch actuators and said control valve regulates the initial pressure and the rate of pressure rise when either of said actuators are operated.

8. In a hydraulic system a control valve having pressure-modulating means as set forth in claim 2 wherein said accumulator and said pressure reducing valve each includes a plunger of a predetermined cross-sectional area, said accumulator control means includes a discharge plunger valve of a predetermined cross-sectional area sensing inlet passage pressure to discharge said accumulator into the exhaust passage to reduce the operating pressure of said reducing valve to a minimum.

9. In a hydraulic system a control valve having pressure-modulating means as set forth in claim 1 wherein said accumulator control means includes a discharge plunger including said orifice means in said discharge plunger severing communications between the inlet passage and said accumulator for discharge of pressurized fluid from said accumulator into the exhaust passage in response to a reduction in pressure and a volume in said inlet passage, said accumulator including a piston and communicating with said inlet passage through said orifice means providing pressure buildup in said accumulator is in response to orifice size, accumulator spring force and areas of accumulator piston and discharge plunger to thereby control the initial pressure in the actuator passage and rate of pressure rise in actuator passage in response to accumulator pressure when said control valve is actuated.